3,736,218
SHRINKABLE PERMEABLE TEXTURE FILM
Razmic S. Gregorian, Arken, S.C., Charles C. Kirk, Laurel, Md., and James A. Cote, Arlington Heights, Ill., assignors to W. R. Grace & Co., New York, N.Y.
Original application Jan. 10, 1969, Ser. No. 790,422, now Patent No. 3,576,927, dated Apr. 27, 1971. Divided and this application Oct. 19, 1970, Ser. No. 82,135
Int. Cl. B32b 27/06, 27/16, 33/00
U.S. Cl. 161—164                             1 Claim

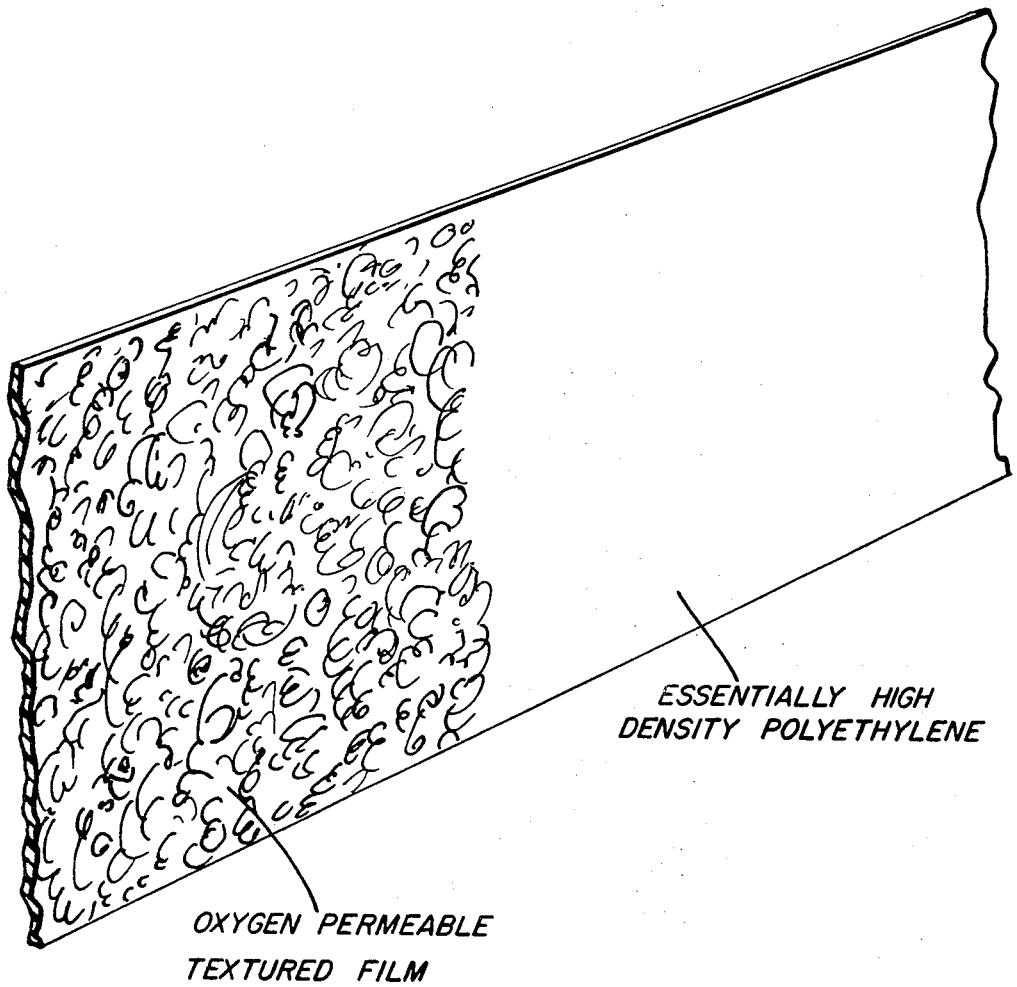

ABSTRACT OF THE DISCLOSURE

Polyethylene films, highly permeable to oxygen, are made by sintering grains of high-density polyethylene, irradiating the resulting sheet to about 3 megarads, melting out the sintered structure, and irradiating a second time. When the sheet is stretched, oxygen permeability is increased as much as 10 times.

---

This is a division of application Ser. No. 790,422, filed Jan. 10, 1969, now U.S. Pat. No. 3,576,927 issued Apr. 27, 1971.

This invention relates to the production of films which are permeable to oxygen. Such films have various specialized uses, but they are especially advantageous in the preservation of beef kidneys in frozen storage where oxygen is necessary to preserve the color of the meat. At the same time, an oxygen-permeable film protects the meat from handling while on the display counters, and prevents bacteria and mold spores from coming in contact with the meat. It also, to a very material degree, cuts down the transfer of water vapor.

We have discovered that if a film of high density polyethylene is prepared in the manner which this specification will set forth, the oxygen permeability of the film jumps by at least one order of magnitude and even more. Interestingly, this effect can only be secured if the density of the resin is high. Low-density material treated in the same manner shows little or no increase in oxygen permeability.

Our invention takes advantage of the fact that if grains of high-density polyethylene are sintered under heat and pressure so that a coherent sheet is formed, and if that sheet thereafter is subjected to electron bombardment to a mild dosage, the sintered structure of the sheet will persist through the further processing steps which are necessary.

Sheets which exhibit this persistent structure have markedly increased permeability to oxygen.

The effects which we describe are at a maximum if all of the polyethylene has a density of 0.93 or higher. If low density (high-pressure polyethylene) appears in the high-density material, the oxygen permeability of the resulting sheet becomes less marked and is insignficant if as much as 10 % of low-density polyethylene appears in the mixture.

The single figure of the drawing shows the persistent structure of the finished sheet.

EXAMPLE 1

Granules of high-density 0.95 polyethylene, melt index 5.0, were pressed between polished sheets to produce a sintered structure $\frac{1}{32}$ of an inch thick. The sheet was then exposed to the beam of a High-Voltage Engineering electron accelerator and given a dose of 3 megarads. Thereafter the sheet was fused under pressure and at 350° F. until the sintered structure appeared to be melted out. The sheets were then allowed to cool, and thereafter were exposed to a further electron bombardment to a dosage of 3 megarads. Following the second irradiation, the sheet was stretched in both directions to 2½ times the length of the sintered sheet. During biaxial stretching the condition of the sheet changes materially and a visual texture appears. The oxygen permeability of the resulting sheet was $26.22 \times 10^3$ cc. mil/ATM–M² Day.

Irradiating the high-density polyethylene to a total dosage of 6 megarads in two successive steps appears to have the following effects: the first irradiation crosslinks the sintered particles to a degree which imparts a locked-in sintered structure memory which persists even though the sheets are fused in the press to replace the sintered structure with a smooth, coherent polyethylene sheet. The subsequent irradiation develops sufficient additional crosslinks to allow the sheet to be stretched biaxially. It is during this biaxial stretching operation that the sintered structure of the sheet is somewhat reproduced and remains visually evident in the oxygen-permeable textured film.

EXAMPLE 2

(Control example)

Grains of 0.95 high-density polyethylene, Grex melt index 5, were placed between polished sheets and pressed at 350° F. to produce a sintered sheet $\frac{1}{32}$ of an inch thick. The sheets were then fused at 350° F. until the sintered structure disappeared. After cooling, the sheet was stretched to 2½ times its original dimension both lengthwise and transversely of the sheet. The oxygen permeability of Example 2 was determined and found to be $2.1 \times 10^3$ cc. mil/ATM–M² Day.

EXAMPLE 3

A blend of 5% by weight of low-density polyethylene, melt index 12 (Microthene 704), and 95% of 0.95 high-density polyethylene copolymer, melt index 5.0 (Grex 50–050 C.) made by melting the two polyethylenes, blending the liquid mixture, and granulating the chilled blend was sintered by heating under pressure, and the following temperature conditions: top platen temperature, 235–250° F.; bottom platen temperature, 250–270° F.; pressing time, 0.25–0.35 minute. The sintered sheets were allowed to cool and then were irradiated as above described to a dosage of 3 megarads. Following irradiation, the sheet was placed under pressure and raised to 350° F. to melt out the sintered structure. Following cooling, the sheet was subjected to a second electron bombardment of 3 megarad dosage. The oxygen permeability of the sheet was subsequently determined and found to be $3.27 \times 10^3$ cc. mil/ATM–M² Day.

EXAMPLE 4

A control sheet made from the same blend of low- and high-density polyethylene utilized in Example 3 was made by following all of the steps recited in Example 3 except the sheet received no irradiation either in the first or second step. The oxygen-permeability of this sheet was tested after the sheet had cooled and was found to be $1.92 \times 10^3$ cc. mil/ATM–M² Day. The foregoing tests show how sheets can be produced which can cover a very considerable range of oxygen permeability. Very small amounts of low-density polyethylene added to the blend drop the oxygen permeability as contrast between Example 1 and Example 3 shows.

What is claimed is:

1. A film possessing materially increased oxygen permeability consisting of a crosslinked oriented ethylene polymer having a density of at least 0.93 characterized by the presence of a visually evident sintered texture in the film, said film having an oxygen permeability of from $3.27 \times 10^3$ cc. mil/ATM–M² Day to 26.22 $10^3$ cc. mil/ATM–M² Day.

(References on following page)

References Cited

UNITED STATES PATENTS

| | | | |
|---|---|---|---|
| 3,463,752 | 8/1969 | Bornstein | 264—22 |
| 3,144,399 | 8/1964 | Rainer et al. | 264—22 |
| 3,036,340 | 5/1962 | Waddell | 264—294 |
| 3,201,503 | 8/1965 | Bennig et al. | 264—95 |
| 3,502,639 | 3/1970 | Statton | 264—126 |
| 2,877,500 | 3/1959 | Rainer et al. | 264—22 |
| 2,904,480 | 9/1959 | Rainer et al. | 264—22 |

GEORGE F. LESMES, Primary Examiner

G. W. MOXON II, Assistant Examiner

U.S. Cl. X.R.

161—247, 402, 412; 204—159.2